J. WALLOS.
MECHANISM FOR BROWNING FLOUR.
APPLICATION FILED SEPT. 3, 1912.
1,064,263.
Patented June 10, 1913.
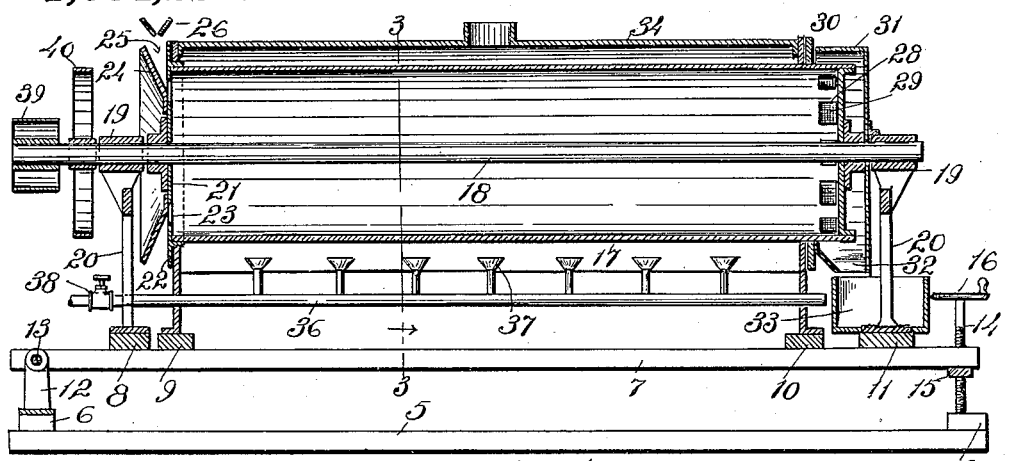
Fig. 1.
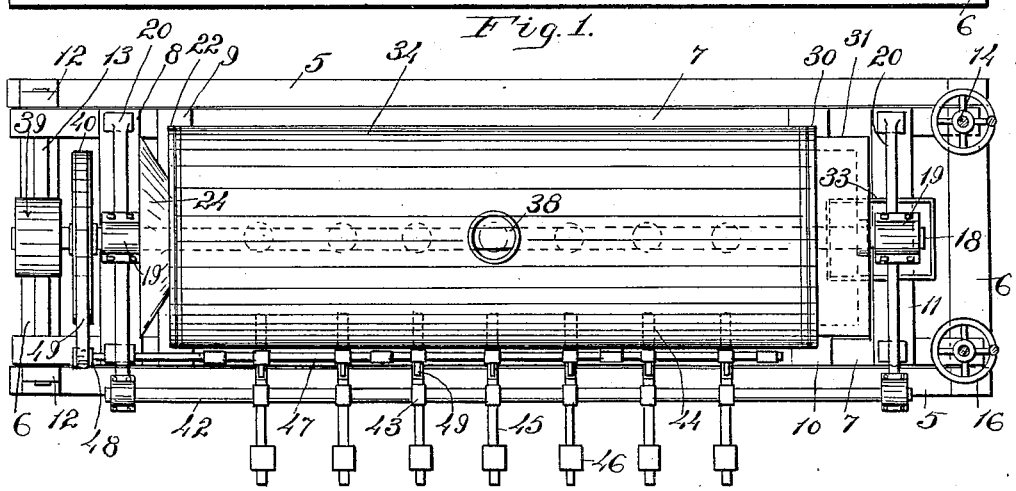
Fig. 2.
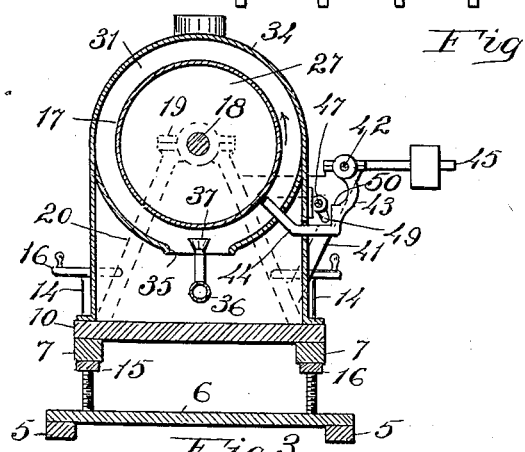
Fig. 3.
Fig. 4.
Witnesses:
Floyd O. Chaffee
D. A. Johnson
Inventor:
Joseph Wallos

UNITED STATES PATENT OFFICE.

JOSEPH WALLOS, OF LOS ANGELES, CALIFORNIA.

MECHANISM FOR BROWNING FLOUR.

1,064,263.     Specification of Letters Patent.     Patented June 10, 1913.

Application filed September 3, 1912. Serial No. 718,288.

*To all whom it may concern:*

Be it known that I, JOSEPH WALLOS, a citizen of the United States, and resident of Los Angeles, in the county of Los Angeles and State of California, have invented certain new and useful Improvements in Mechanism for Browning Flour, of which the following is a specification.

This invention pertains to mechanism for browning flour, and the object is to provide power mechanism for this purpose which shall be capable of making a uniform product, and have means for regulating the same to turn out a greater or less quantity in a given time without deteriorating the same.

It is an exceedingly difficult matter to brown flour so as to make it uniform. If the heat is too intense the flour next the heated surface will be carbonized and give a bitter taste to the entire mass, and if there is not sufficient heat the color of the product is not uniform, and is not salable.

To this end, therefore, I have devised mechanism which enables me to feed or supply a certain quantity of flour continuously to the machine, and to so regulate the discharge of the machine that the output will be uniformly browned, as will now be set forth in detail.

In the accompanying drawing Figure 1 is a central vertical longitudinal section of my improved mechanism for browning flour. Fig. 2 is a top or plan view of the machine. Fig. 3 is a vertical cross section of the machine, on line 3 of Fig. 1, and Fig. 4 is a view of the rear end of the machine.

In carrying out my invention I prepare a base of any suitable length and width, which in this instance comprises the two parallel sills 5 joined at their ends by cross bars 6. Above this base is an adjustable base comprising two parallel longitudinal bars 7—7, secured together by cross bars, 8, 9, 10, 11. The base 5 at one end has a pair of upwardly-projecting brackets or posts 12 to which posts the adjustable base is hinged by means of a cross pivot rod 13. The other end of the adjustable base is adjustable vertically through a pair of threaded stems 14, these stems passing through nuts 15 which rest on the lower side of the bars 7, and having their lower ends resting on the cross bar 6. Hand wheels 16 on their upper ends provide a means whereby the adjustable base may be elevated or depressed and thus enable the user to give any desired angle to the base. On the adjustable base thus constructed I mount a revoluble cylindrical shell 17, this shell having axially a shaft 18 which passes through the entire shell, and is mounted in bearings 19 carried by the standards 20, these standards being secured to the bars 7 of the adjustable base.

The shell 17 has the head 21 at its front end provided with an annular flange 22, and through the head is a series of openings 23 through which the flour or other product is fed to the cylinder. A funnel-shaped disk 24 is secured to the head 21 so as to provide an annular V-shaped channel 25 which leads to the openings 23, and thereby direct the flour fed from the hopper 26 to the openings in the head. The head 27 at the rear end of the shell closes the end completely, but square peripheral openings 28 are formed through the shell next to the head 27, and fine wire screens 29 cover these openings, the object being to screen and break up the browned product as it passes from the shell, and prevent it from balling. In front of the discharge openings thus formed is an exterior annular flange 30 on the shell, corresponding with the annular flange 22 at the other end of the shell.

A shield 31 is formed around the discharge end of the shell, this shield extending up to a point near the annular flange 30, and it is secured to the bearing standard 20 in any suitable manner. At the lower side of the shield is an opening 32, which serves as a means for discharging the product into a receptacle 33.

A stationary shell or jacket 34 is formed around the cylindrical shell 17, the lower side of the jacket being open as shown at 35, and the jacket extends up to the flanges 22, 30, so that the shell 17 may freely revolve within the jacket. In the opening 35 of the jacket I place a horizontal fuel supply pipe 36, which is provided with burners 37, and the pipe 36 has a feed regulating valve 38, so that the burners throw the heat directly against the shell 17 and the jacket retains the heated air around the shell until it is discharged through the opening 38 formed through the upper side of the jacket 34.

At the forward end of the machine the shaft 18 is provided with a pulley 39 to receive motion from any source of power, and alongside is a large pulley 40.

The standards 20 are each provided with a lateral extension bracket 41, in the ends of which a shaft 42 is journaled, which extends along parallel with the jacket 34. This shaft 42 carries thereon a plurality of knocker arms, each arm 43 extending downwardly, and having an inwardly projecting limb 44, which passes into an opening formed through the jacket 34, so that its inner end is normally in contact with the shell 17.

A horizontal arm 45, integral with the arm 43 projects out from each knocker, which carries a weight 46, the action of the weight being such that the end of the limb 44 is held in contact with the shell 17.

Below the fixed shaft 42, and parallel therewith, is a revoluble shaft 47 which carries at one end a small pulley 48 in alinement with the pulley 40 on the shaft 18, and a belt 49 on these pulleys transmits power from the shaft 18 to shaft 47.

The revoluble shaft 47 carries in alinement with each knocker a hub with a stud 49 thereon, this stud being adapted to engage with the inner side of the arm 43, so that as the shaft 47 revolves the stud 49 will engage with the arm 43 and draw the end of the limb 44 away from the shell 17. When the stud 49 passes a shoulder 50 on the contact side of the arm 43, the weight 46 carries down the arm 45 and causes the finger 44 to strike the shell 17, and in doing so the concussion will cause any flour which adheres to the inside of the shell to fall, and thereby keep the shell from getting an accumulation of the product treated.

In operation the shell 17 is slowly turned, after the burners have suitably heated the same, and flour is supplied to the shell from the hopper 26 to the openings 23 in the head of the shell. The rear end of the machine is depressed by the hand wheels 16 until the proper angle is given to the shell 17, and as the shell turns the flour is permitted to fall from the ascending side of the cylinder, and is thus distributed along the shell in the direction of the rear end outlets, the heat being such as to properly brown the flour.

The speed of its transit through the shell will be dependent on the angle of the shell, and the proper browning effect can be readily obtained by a regulation of the heat and by the revoluble speed of the shell.

What I claim as new, is:

In a machine for browning flour, a base having thereon a vertically adjustable base, a cylindrical shell mounted on said adjustable base, one end of said shell having inlet openings, and a funnel-shaped plate to direct the product into the shell, the other end of said shell having discharge openings with reticulated screens thereon, a stationary jacket around the revoluble shell, heating means between the shell and jacket carrying thereon knockers to contact with the revoluble shell, and a revoluble shaft operatively connected with the shaft of the revoluble shell having means for actuating said knockers.

Signed at the city of Los Angeles, county of Los Angeles, State of California, this 21st day of March, 1912, in the presence of witnesses.

JOSEPH WALLOS.

Witnesses:
EDMUND KASDEL,
J. S. ZERBE.

Copies of this patent may be obtained for five cents each, by addressing the "Commissioner of Patents, Washington, D. C."